F. M. SONDAY.
DRAINAGE DEVICE.
APPLICATION FILED JULY 22, 1921.
1,430,197.
Patented Sept. 26, 1922.
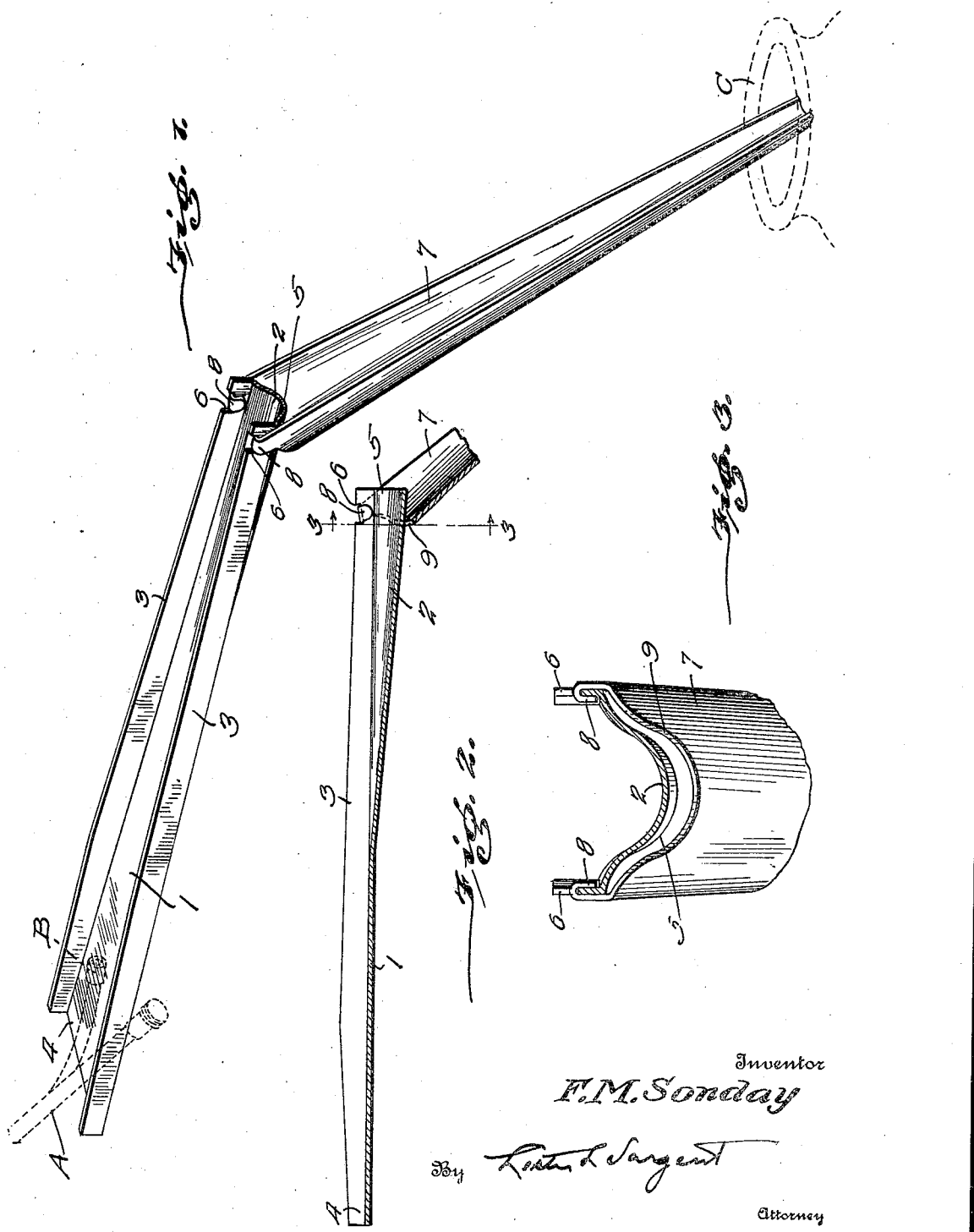

Patented Sept. 26, 1922.

1,430,197

UNITED STATES PATENT OFFICE.

FRANCIS M. SONDAY, OF CHURUBUSCO, INDIANA.

DRAINAGE DEVICE.

Application filed July 22, 1921. Serial No. 486,871.

*To all whom it may concern:*

Be it known that I, FRANCIS M. SONDAY, a citizen of the United States, residing at Churubusco, in the county of Whitley and State of Indiana, have invented a new and useful Drainage Device, of which the following is a specification.

The object of my invention is to provide the novel drainage device for the use of undertakers for use in place of rubber hose which is customarily used and which necessitates additional work in cleaning. I attain the objects of my invention by the apparatus illustrated in the accompanying drawings, in which—

Figure 1 is a perspective view of the device assembled;

Fig. 2 is a longitudinal section of the device, and

Fig. 3 is a vertical section on line 3—3 of Fig. 2.

Like numerals designate like parts in each of the several views.

Referring to the accompanying drawings, I provide a metal trough 1 having the lower portion of the trough narrowed and bent downwardly as shown in the drawings. Trough 1 is provided with upturned sides 3 and with a widened receiving end 4 into which the drainage tube B of the blood pump A discharges. Near the discharge end 5 of the trough 1 I provide slots 6 in the upturned sides 3, said slots being engaged by the hooks 8 formed on the upper end of the detachable depending trough 7 which discharges into any suitable receptable C. This trough 7 is detached from the first trough when the device is not in use. Trough 7 has a cut-out end 9 to allow it to hang in slanting position and to support it in such slanting position by reason of its abutment with the under side of the correspondingly shaped portion 2 of trough 1, as shown in Fig. 1.

The device is used in the manner illustrated in Fig. 1 of the drawings. It provides a convenient means for draining the blood from the corpse instead of using the customary rubber hose, which may require cleaning two or three times during the process of embalming a body. This instrument is readily cleaned and is conveniently applied or attached for use, and readily assembled.

What I claim is—

1. A drainage device for undertakers, comprising a metal trough widened at its receiving end and narrowed at its mouth and having upturned sides, said trough having slots in its upturned sides near its mouth, and a second trough positioned under the mouth of the first-mentioned trough and having hooked members releasably engagable in the slotted portions of the first mentioned trough and depending therefrom, substantially as shown.

2. In a drainage device for use in embalming, consisting of a metal trough widened at its upper end to conveniently receive the mouth of a drainage tube, a second trough, and means detachably connecting the second trough with the discharge end of the first mentioned trough said means holding the second trough in an abrupt downwardly slanting position relative to the first mentioned trough, for the purposes described.

FRANCIS M. SONDAY.